March 14, 1967 G. E. LEMIEUX 3,308,841
FLUID PRESSURE GOVERNOR MECHANISM
Filed July 3, 1963 2 Sheets-Sheet 1

George E. Lemieux,
INVENTOR.

BY John R. Faulkner
Robert E. McCollum
ATTORNEYS.

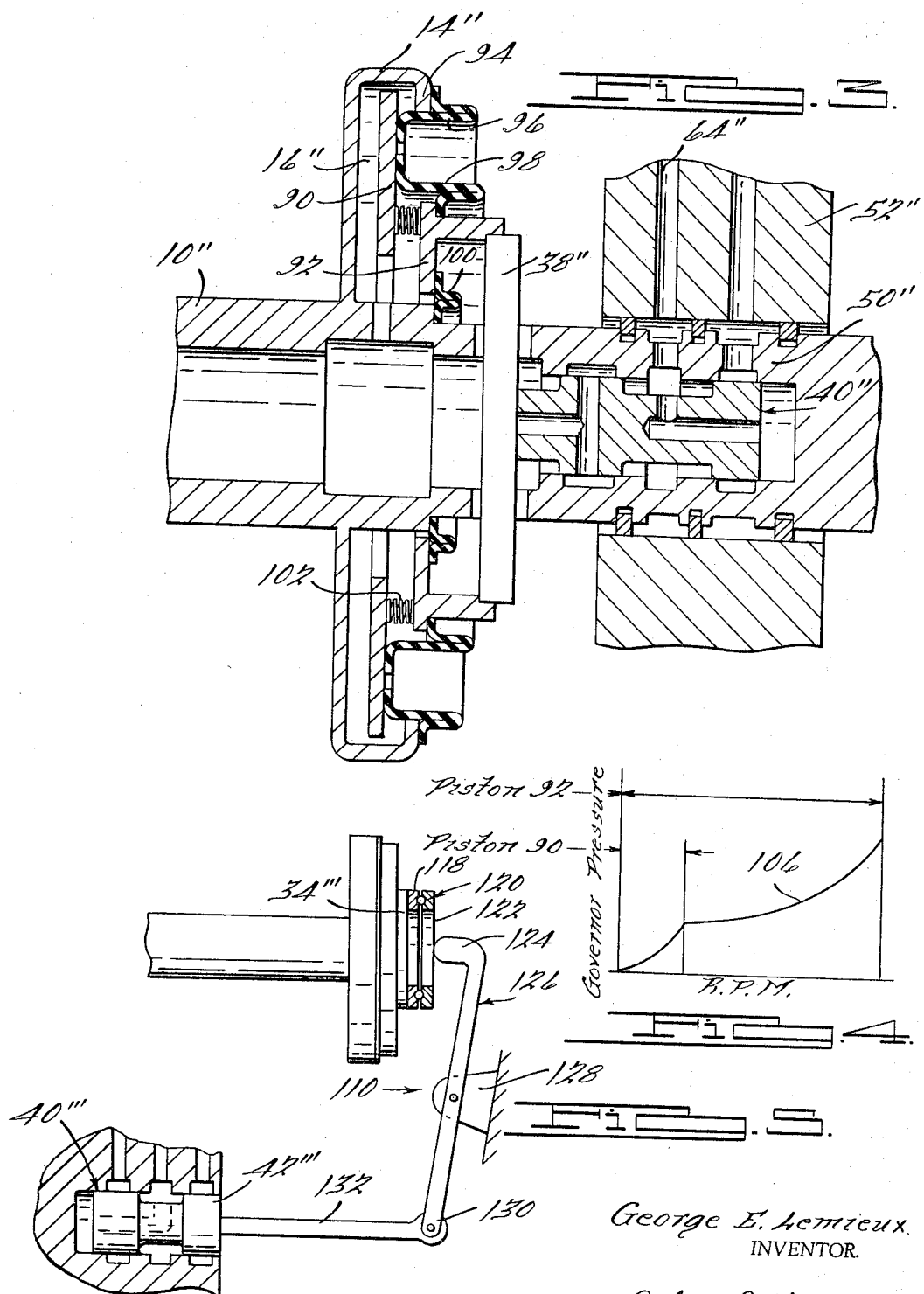

United States Patent Office 3,308,841
Patented Mar. 14, 1967

3,308,841
FLUID PRESSURE GOVERNOR MECHANISM
George E. Lemieux, Dearborn, Mich., assignor to Ford Motor Company, Dearborn, Mich., a corporation of Delaware
Filed July 3, 1963, Ser. No. 292,546
9 Claims. (Cl. 137—47)

This invention relates to a fluid pressure governor mechanism, and more particularly to one utilizing the dynamic head pressure force developed by rotation of a mass of fluid to control movement of a governor output pressure signal regulating valve.

Known constructions of centrifugal fluid pressure governors generally require a plurality of centrifugal or speed responsive actuators and/or other members, such as, for example, flyball weights, and linkages and levers. These constructions generally occupy an extensive amount of space, and the use of a large number of parts not only reduces the efficiency of operation and responsiveness of the governor pressure signal to changes in speed, but also increases the complexity of the system.

The invention provides a fluid pressure governor having a valve for regulating the flow and pressure of fluid in a governor output pressure control passage as a function of the change in speed of rotation of a mass of fluid in a rotating chamber. More specifically, the invention provides a governor output fluid pressure regulating valve moved throughout its regulating range or ranges by the differential force between the output fluid pressure acting on one portion of the valve, and a servo mechanism moving the valve in the opposite direction. The servo mechanism is operated by the dynamic head pressure force of a fluid in a rotating chamber. The pressure level of the fluid in the governor fluid output passage thus varies as a function of the change in speed of rotation of the fluid in the rotating chamber.

It is therefore an object of the invention to provide a fluid pressure governor that is simple in construction, economical to manufacture, and efficient in operation.

It is another object of the invention to provide a fluid pressure governor having one or more stages of fluid pressure regulation for varying its fluid output pressure signal as a function of the change in speed of rotation of a shaft.

It is a further object of the invention to provide a fluid pressure governor construction having a regulating valve operably controlled in its movement by the change in the dynamic head induced on a rotating body of fluid.

It is a still further object of the invention to provide a fluid pressure governor including a force differentially operated valve regulating the supply of fluid under pressure to a fluid output pressure passage, the valve being reciprocated by the differential in forces between the output fluid pressure as opposed by the force applied by a piston moved in response to changes in the dynamic head pressure on a fluid in a rotating chamber.

It is also an object of the invention to provide a fluid pressure governor mechanism having a governor fluid output pressure regulating valve that is actuated by a dynamic head fluid pressure responsive piston unit either directly or by a remote force transmitting mechanism. The latter construction permits units of the governor mechanism to be installed in different locations, thus rendering it more universally usable.

Other objects, features, and advantages of the invention will become apparent upon reference to the succeeding, detailed description thereof, and to the drawings illustrating the preferred embodiments thereof; wherein, FIGURE 1 is a cross-sectional view of one embodiment of the invention illustrating a governor having a single stage of fluid pressure regulation;

FIGURE 3 is a cross-sectional view of a two stage fluid pressure governor embodying the invention;

FIGURE 4 is a chart graphically illustrating the relationship of governor fluid output pressure versus speed of rotation for the construction of FIGURE 3; and, FIGURE 5 is a partially cross-sectioned view of another embodiment of the invention.

The governor to be described preferably is for use in connection with a motor vehicle type automatic transmission for providing a fluid output pressure signal that is indicative of a change in speed of the vehicle. In such an installation, the changing fluid output pressure signal generally is used to actuate a number of transmission drive ratio control shift valves so as to cause a change in gear ratio at appropriate vehicle speeds. The governor, therefore, normally is driven by the transmission power output shaft, although it could be used to provide a pressure signal varying as a function of the speed of the transmission input or any other shaft. It will be clear, however, that the governor would have use in any installation wherever a fluid pressure signal indicative of the change in speed of a rotating shaft is desired.

Figure 1:
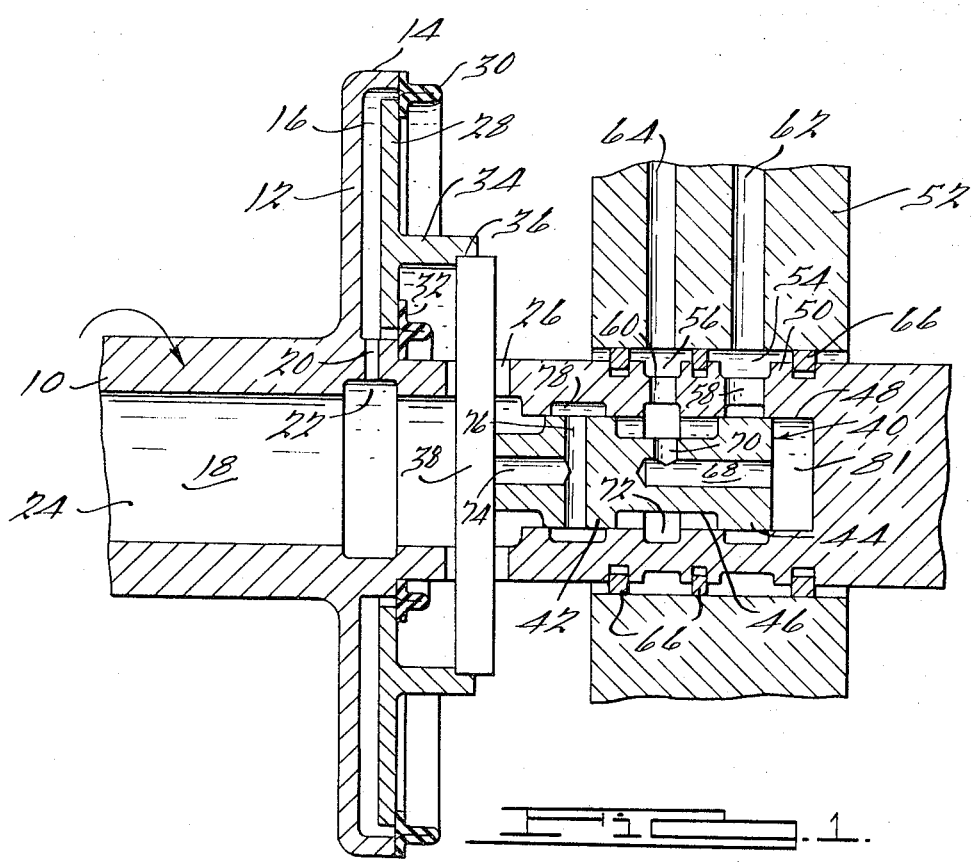

FIGURE 1 shows a governor providing a single range of fluid pressure regulation. It has a hollow longitudinally extending shaft 10 adapted to be rotated by any suitable means, not shown, with an annular extension 12 projecting radially from it. The extension, together with an axially extending annular flange 14, define an open end fluid chamber 16. The chamber communicates with the bore 18 of shaft 10 through one or more radial bores 20 opening into an enlarged diameter annular fluid manifold 22 provided in the shaft. The bore 18, during normal operation, is supplied with fluid from any suitable source, not shown, through its end 24. The bore could, for example, form part of a passage to return oil or other fluid to a sump from the system with which the governor is associated by passing the oil through the bore and out holes 26 provided in the shaft. Other suitably located holes could be used. Since shaft 10 normally rotates, the oil will flow along the walls of bore 18, and by centrifugal force, be thrown into manifold 22. The manifold 22 therefore serves to collect a portion of the oil for delivery through passage 20 into fluid chamber 16.

The open side of chamber 16 is closed by an annular piston 28 axially slidably mounted on the shaft 10. The radial clearances between the piston and the flange 14 and shaft 10 are sealed by annular diaphragm type seals 30 and 32. Other suitable type seals, such as, for example, lip seals, could be used.

Piston 28 has an axially extending annular portion 34, the inner peripheral edges of which are shouldered at 36 to receive a cross piece 38. The cross piece is fixed to diametrically opposite edges of portion 34 and extends through the holes 26. The clearance between the cross piece and the bore walls defining holes 26 is sufficient to permit an axial travel of the cross piece for the same distance as that traversed by the piston 28 during its operating movement. The cross piece has a thin streamlined shape in cross section, for a purpose to be described, and is fixedly secured at its midpoint to a governor fluid output pressure regulating valve 40.

Valve 40 is of the spool type, and has two spaced annular lands 42 and 44 connected by a neck portion 46 of reduced diameter. The valve is slidably mounted in a reduced diameter extension 48 of bore 18. The portion of shaft 10 surrounding valve 40 constitutes a valve body 50, and is rotatably mounted within a stationary annular structure 52.

The valve body portion 50 has has two spaced external annular fluid pressure manifolds 54 and 56 connected to bore 48 by intersecting bores 58 and 60.

The manifolds 54 and 56 are connected, respectively, at all times to fluid passages 62 and 64 in the supporting structure 52. Passage 62 contains fluid at a predetermined line or system pressure, while passage 64 constitutes the fluid outlet passage for the governor. Passage 64 normally leads to a mechanism to be actuated, and would be closed, permitting a pressure buildup in this passage. Suitable seals 66 prevent leakage through the clearance between the structure 50 and the valve body portion.

Valve 40 has a central bore 68 connected by a crossbore 70 to the annular space 72 between lands 42 and 44. It also has a central passage 74 connected by a crossbore 76 to an internal annular fluid exhaust manifold 78 provided in the valve body. Passage 74 has a larger diameter than the thickness of cross piece 38 so that fluid in manifold 78 can pass easily into bore 18 and through holes 26.

The valve lands 42 and 44 are spaced axially a distance such that land 44 completely closes supply bore 58 just as land 42 connects chamber 72 to exhaust manifold 78. Thus, when bore 58 is open to admit line pressure to passage 64 and chamber 72 and through line 68 to bore 48, the exhaust manifold 78 will be closed. Conversely, when the valve moves to connect the exhaust manifold to chamber 72, line 64, and bore 48, inlet bore 58 will be closed off.

Valve 40 is therefore movable between positions regulating or modulating the flow of fluid at line pressure from passage 62 to the governor fluid output pressure passage 64, or bleeding fluid therefrom through manifold 78 and bores 76 and 74. The fluid under pressure in the chamber 81 defined between the end of bore 48 and the end face 80 of valve 40 therefore exerts a fluid pressure force attempting to close off communication between the line pressure passage 62 and the governor pressure passage 64. This pressure is in opposition to the force exerted on the valve by movement of piston 28, and therefore constantly changes in response to movement of the piston in an attempt to move the valve to a balanced force position.

In operation, fluid initially is supplied to bore 18 of stationary shaft 10 to flow by gravity into chamber 16, to partially fill it. As soon as shaft 10 begins rotating, the fluid flowing through its bore will be centrifuged outwardly and flow into and past the manifold 22 and out through holes 26. The fluid trapped by the manifold 22 is similarly centrifuged outwardly to fill the fluid pressure chamber 16.

The rotating mass of fluid in chamber 16 is thus subjected to the effects of centrifugal force causing a dynamic head to be induced thereon that varies as the square of the speed of rotation and as a function of the radial extent of the chamber. This rising pressure force acts against the face of piston 28, moving it, cross piece 38, and valve 40 axially to the right from the positions shown. Bore 58 is therefore opened to admit line pressure to chamber 72 and also to chamber 81 behind the valve. Governor pressure passage 64 being essentially a closed passage, the pressure in chamber 81 rises until it is sufficient to balance the force exerted on the valve by the piston 28. For any given speed of rotation, therefore, changes in the fluid pressure in chamber 81 will cause the valve to be moved to the right or left, as the case may be, to supply or bleed fluid to maintain a pressure that will balance the dynamic head pressure force on the other end of the valve.

As the speed of rotation of shaft 10 changes, the dynamic head pressure force in chamber 16 will also change, as will the pressure in chamber 81 in an attempt to move the valve to an equilibrium position.

Figure 2:
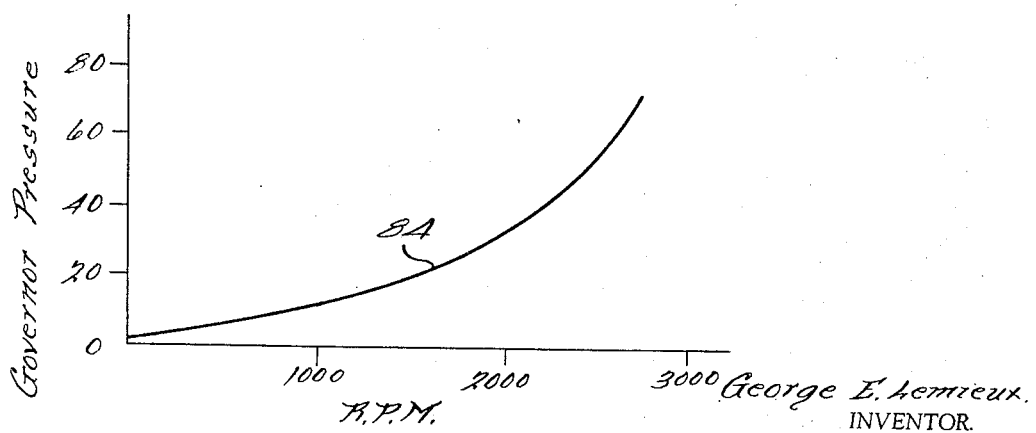
FIGURE 2 is a chart graphically illustrating the relationship between the governor fluid output pressure and the speed of rotation of the governor of FIGURE 1.

It will therefore be seen that the output pressure signal in passage 64 will vary as a function of the change in speed of rotation of the fluid in chamber 16. This rate of change of pressure is illustrated graphically in FIGURE 2 by the parabolic curve 84, wherein the governor fluid output pressure is plotted against the speed of rotation.

FIGURE 3 shows a two stage fluid pressure governor embodying the invention. In this figure, the details of construction and operation of the regulating valve 40″ and its cooperating valve body 50″ and supporting structure 52″ remain the same as in FIGURE 1. The differences lie in the members in operating chamber 16″ for actuating the cross piece 38″.

In this embodiment, the chamber 16″ is closed by two annular pistons 90 and 92, the piston 90 being of a larger diameter than piston 92. The axial flange 14″ has a radially extending lip flange 94 that serves as a stop for the movement of piston 90. The clearances between piston 90 and flange 94, and between the two pistons, and between piston 92 and shaft 10″ are sealed by suitable diaphragm type seals 96, 98 and 100. A number of springs 102 axially space pistons 90 and 92 from each other, and serve to transmit the movement of piston 90 to piston 92 for a purpose to be described.

It will be clear from an inspection of FIGURE 3 that because of piston 90 extending a greater radial distance from the shaft axis than piston 92, the dynamic head developed on the fluid will exert a greater force against piston 90 than against piston 92, and piston 90 will be moved axially at a faster rate than piston 92. These differences make it possible to provide two stages of fluid pressure regulation; i.e., a first stage where the rate of change of pressure rise in outlet passage 64″ is fast, followed by a second stage providing a slower rate of change of the pressure rise. The springs 102 and flange 94 provide this sequential operation. That is, piston 92 normally moves more slowly to the right under the dynamic head pressure force than piston 90. Therefore, until piston 90 contacts piston 92, only a slow rate of change of pressure rise would be provided, since only piston 92 moves cross piece 38″. However, by positioning springs 102 between the pistons, the faster movement of piston 90 is transmitted to piston 92 until piston 90 abuts stop flange 94. At this point, piston 92 moves independently to the right to provide the sole control of the movement of valve 40″. As a result, the slower rising force acting on the regulating valve will cause the governor fluid output pressure signal to rise at a slower rate, as reflected by the curve 106 illustrated in FIGURE 4.

Thus, it will be seen that the governor initially develops a fluid output pressure signal in line 64″ having a fast rate of change in the pressure rise due to the movement of both pistons simultaneously. Once piston 90 bottoms against stop 94, the rate of change of pressure rise is at a lower rate provided by the continued independent movement of the piston 92.

FIGURE 5 shows a further embodiment of the invention. In this figure, the construction and operation of the regulating valve 40‴ is identical to that shown in FIGURES 1–4. Also, the construction and operation of the dynamic head fluid pressure actuated piston or pistons moving in chamber 16 can be the same as that shown in either FIGURES 1 or 3. The difference between this figure and preceding constructions is that linkage means 110 is substituted for the cross piece 38, and the regulating valve is remotely located.

FIGURE 5 shows the axial ring-like piston flange 34‴ fixed to the rotatable race 118 of a bearing unit 120. The stationary bearing race 122 abuts the knob-like end 124 of an actuating lever 126. The lever has a fulcrum 128 substantially at its midpoint, and is pivotally connected at its opposite end 130 to one end of a plunger 132. The opposite end of the plunger is fixed to the land 42‴ of valve 40‴.

With this construction, the regulating valve 40‴ need not be positioned in axial alignment with or adjacent the actuating cylinder and piston unit, but can be located in a more convenient position where space demands deem it desirable. The governor of FIGURE 5 operates overall in a manner substantially identical to that of the constructions shown in the preceding FIGURES 1–4 with the exception that axial movement of the piston unit is transmitted to the regulating valve 40''' by pivotal movement of the lever 126 instead of directly by cross piece 38.

From the foregoing, it will be seen that the invention provides a fluid pressure governor mechanism that utilizes the dynamic head developed on a rotating body of fluid to apply a varying force on a governor fluid output pressure regulating valve, the force, and therefore the output pressure, varying as a function of the speed of rotation of the mass of fluid.

While the invention has been illustrated in the figures in its preferred embodiments, it will be clear to those skilled in the arts to which the invention pertains, that many changes and modifications may be made thereto without departing from the scope of the invention.

I claim:

1. A fluid pressure governor mechanism comprising, in combination, a rotatable shaft having a fluid chamber projecting radially from the axis of rotation of said shaft, a plurality of fluid pressure actuated means of different radial extent in said chamber so as to be subject to different effects of fluid centrifugal forces acting thereon and thereby each variably movable by the dynamic head fluid pressure force induced thereon upon rotation of said shaft, a valve, means operatively transmitting the variable movement of each of said means to said valve, a valve body having line pressure and governor pressure and exhaust control passages and a bore connecting said passages and slidably receiving said valve, said line pressure passage containing a fluid under pressure, said valve controlling communication of fluid between said line pressure and governor pressure passages and said governor pressure and exhaust control passages, and means connecting the fluid under pressure in said governor passage to one portion of said valve to act thereon to oppose movement of said valve by said fluid pressure actuated means to regulate the pressure level of the fluid in said governor pressure passage as a function of the change in speed of rotation of said shaft and the radial extents of the plurality of fluid pressure actuated means.

2. A fluid pressure governor mechanism comprising, in combination, a rotatable shaft having a fluid chamber projecting radially from the axis of rotation of said shaft, a plurality of fluid pressure actuated piston means each of a different radius in said chamber so as to be subject to different effects of fluid centrifugal forces acting thereon and thereby each variably movable by the dynamic head fluid pressure force induced thereon upon rotation of said chamber, a valve, means operatively transmitting the variable movements of said piston means to said valve to provide movement of said valve in different stages, means to transmit the movement of some of said piston means to the remaining of said piston means during a first stage of operation, the remaining of said piston means being operable independent of said some piston means during a second stage of operation, a valve body having spaced line pressure and governor pressure and exhaust control passages and a bore connecting said passages and slidably receiving said valve, said line pressure passage containing a fluid under pressure, said valve regulating the flow of fluid between said line pressure and governor pressure passages and said governor pressure and exhaust control passages, and means connecting the fluid under pressure in said governor pressure passage to one portion of said valve to act thereon to oppose movement of said valve by said piston means to regulate the pressure level of the fluid in said governor pressure passage in a plurality of stages as determined by the change in speed of rotation of said shaft and the radii of the plurality of fluid pressure actuated means.

3. A fluid pressure governor mechanism comprising, in combination, a rotatable shaft having a fluid chamber projecting radially from the axis of rotation of said shaft, a plurality of fluid pressure actuated piston means each of a different radius in said chamber so as to be subject to different effects of fluid centrifugal forces acting thereon and thereby each variably movable by the dynamic head fluid pressure force induced thereon upon rotation of said chamber, a valve, means operably transmitting the variable movements of said piston means to said valve to provide movement of said valve in a plurality of stages, means between said piston means to transmit the movement of some of said piston means to the remaining of said piston means during a first stage of operation, the remaining of said piston means being operable independent of said some piston means during a second stage of operation, a valve body having spaced line pressure and governor pressure and exhaust control passages and a bore connecting said passages and slidably receiving said valve, said line pressure passage containing a fluid under pressure, said valve controlling communication of fluid between said line pressure and governor pressure passages and said governor pressure and exhaust control passages, and means connecting the fluid under pressure in said governor pressure passage to one portion of said valve to act thereon to oppose movement of said valve by said piston means to regulate the pressure level of the fluid in said governor pressure passage in a plurality of stages as determined by the change in speed of rotation of said shaft and the radii of the plurality of fluid pressure actuated means.

4. A fluid pressure governor mechanism comprising, in combination, a rotatable shaft having a fluid chamber projecting radially from the axis of rotation of said shaft, first and second fluid pressure actuated pistons each of a different radius in said chamber so as to be subject to different effects of fluid centrifugal forces acting thereon and thereby each variably movable at a different rate by the dynamic head fluid pressure force induced thereon upon rotation of said chamber, a valve, means operably transmitting the variable movements of said pistons to said valve to provide movement of said valve in first and second stages, means between said pistons to transmit the movement in one direction of said first piston to the second piston during a first stage of operation, stop means limiting movement of said first piston in said one direction, said second piston being operable independently to establish a second stage of operation, a valve body having spaced line pressure and governor pressure and exhaust control passages and a bore connecting said passages and slidably receiving said valve, said line pressure passages containing a fluid under pressure, said valve controlling communication of fluid between said line pressure and governor pressure passages and said governor pressure and exhaust control passages, and means connecting the fluid under pressure in said governor pressure passage to one portion of said valve to act thereon to oppose movement of said valve by said piston means to regulate the pressure level of the fluid in said governor pressure passage in two stages as a function of the change in speed of rotation of said shaft and the movement of said first and second pistons.

5. A multi-stage fluid pressure actuating mechanism comprising, in combination, a rotatable shaft having a fluid chamber projecting radially from the axis of rotation of said shaft, a plurality of fluid pressure actuated means of different radial extent in said chamber so as to be subject to different effects of fluid centrifugal forces acting thereon and thereby each being variably movable at a different rate by the different dynamic centrifugal head fluid pressure forces induced thereon upon rotation of said shaft, a member to be actuated, and means operatively transmitting the variable movement of each of said means to said member to provide a variable movement of said member at different rates varying as a function of the change in speed of rotation of said shaft and the radial extents of the plurality of fluid pressure actuated means.

6. A multi-stage fluid pressure actuating mechanism comprising, in combination, a rotatable shaft having a fluid chamber projecting radially from the axis of rotation of said shaft, a plurality of fluid pressure actuated piston means each of a different radius in said chamber so as to be subject to different effects of fluid centrifugal forces acting thereon and thereby each being variably movable at a different rate by the different dynamic centrifugal head fluid pressure forces induced thereon upon rotation of said chamber, a member to be actuated, means operatively transmitting the variable movements of said piston means to said member to provide movement of said member in different stages, and means to transmit the movement of some of said piston means to the remaining of said piston means during a first stage of operation, the remaining of said piston means being operable independent of said some piston means during a second stage of operation.

7. A two-stage fluid pressure actuating mechanism comprising, in combination, a rotatable shaft having a fluid chamber projecting radially from the axis of rotation of said shaft, first and second fluid pressure actuated pistons each of a different radial extent in said chamber so as to be subject to different effects of fluid centrifugal forces acting thereon and thereby each being variably movable at a different rate by the different dynamic centrifugal head fluid pressure forces induced thereon upon rotation of said chamber, a member to be actuated, means operably transmitting the different variable movements of said pistons to said member to provide movement of said member in first and second stages, means between said pistons to transmit the movement in one direction of said first piston to the second piston during a first stage of operation, and stop means limiting movement of said first piston in said one direction, said second piston being movable independently to establish a second stage of operation subsequent to abutment of said first piston against said stop means.

8. A fluid pressure actuating means as in claim 7, said means between said pistons to transmit movement of said first piston to said second piston comprising spring means.

9. A fluid pressure actuating means as in claim 8, said pistons being movable axially.

References Cited by the Examiner
UNITED STATES PATENTS

| | | | |
|---|---|---|---|
| 1,222,984 | 4/1917 | Pharo | 73—523 |
| 1,530,740 | 3/1925 | Smoot | 73—523 |
| 2,603,472 | 7/1952 | Adler | 137—34 |
| 2,642,275 | 6/1953 | Sollinger | 137—47 X |
| 2,865,227 | 12/1958 | Kelly | 137—58 X |
| 3,023,625 | 3/1962 | Clement | 137—56 X |

FOREIGN PATENTS 763 of 1877 Great Britain.

CLARENCE R. GORDON, *Primary Examiner.*